Dec. 11, 1945.   J. K. NORTHROP ET AL   2,390,730
AIRPLANE STRUCTURE
Filed June 10, 1940   3 Sheets-Sheet 3
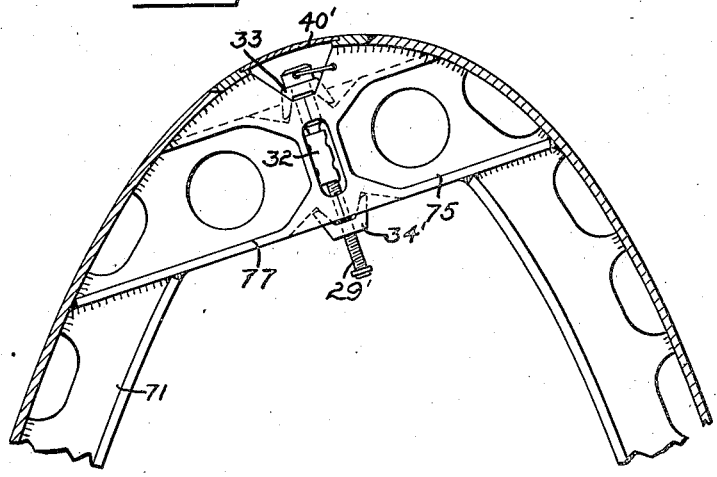
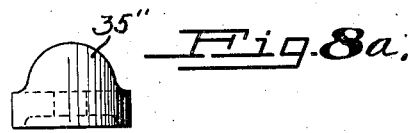
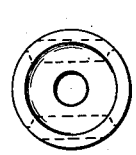
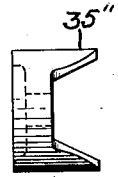
INVENTORS,
JOHN K. NORTHROP.
BY VLADIMIR H. PAVLECKA.
ATTORNEYS.

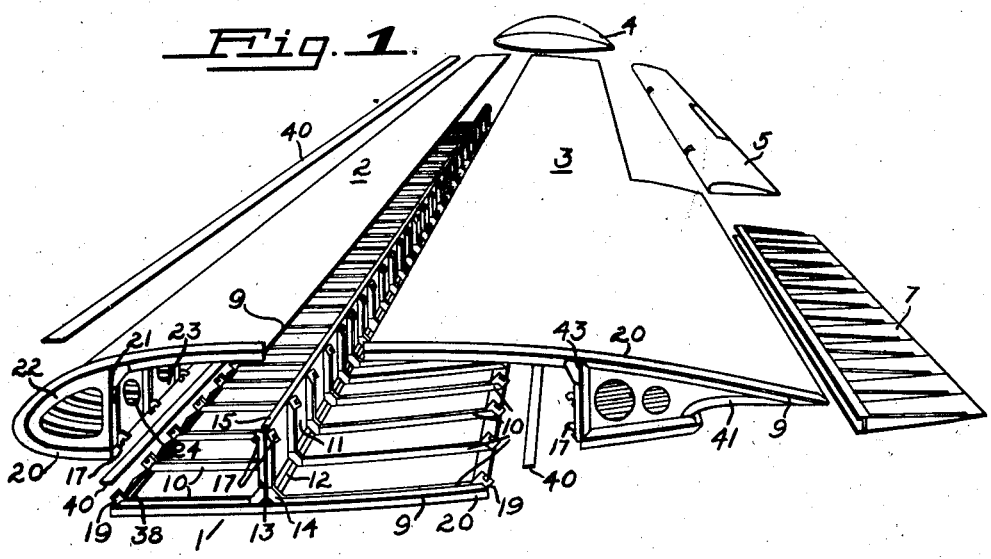

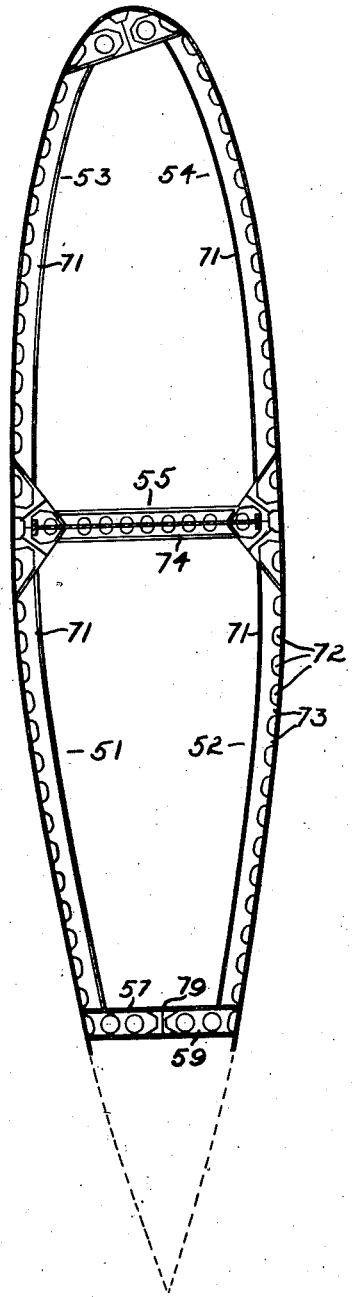
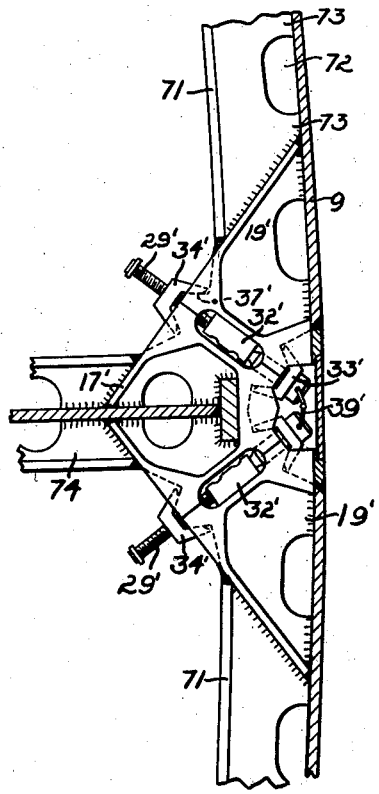
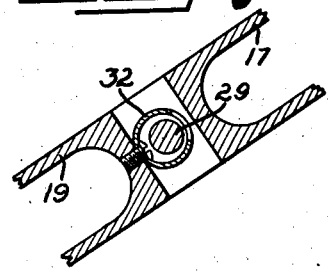
INVENTORS,
JOHN K. NORTHROP.
VLADIMIR H. PAVLECKA.
BY
ATTORNEYS.

Patented Dec. 11, 1945

2,390,730

UNITED STATES PATENT OFFICE 2,390,730

AIRPLANE STRUCTURE

John K. Northrop, Los Angeles, and Vladimir H. Pavlecka, Pacific Palisades, Calif., assignors to Northrop Aircraft, Inc., Hawthorne, Calif., a corporation of California Application June 10, 1940, Serial No. 339,645

6 Claims. (Cl. 244—124)

This invention relates to aircraft construction, and more particularly to aircraft construction of the monocoque type, and especially to such structures as are embodied in the wings and other airfoil sections of an airplane.

An airplane wing, considered from the structural standpoint, comprises a beam from which, in flight, the useful load of the airplane is suspended, and whose weight in turn must be carried by the central or load-carrying portion of the plane when the plane is on the ground. Up to ten or twelve years ago it was customary to construct this beam as one or more wing spars to which were secured ribs which in turn carried the skin of fabric, wood, or metal, the latter carrying none of the beam stresses. This structure was extremely complex, and involved thousands of parts in even a small wing. More recently airfoil designs have been based on the monocoque principle, wherein the tensional and compressional stresses along the beam have been carried, in part at least, by the skin of the plane, which has resulted in a great simplification of the structure and the use of many less parts, although the monocoque ideal has never been fully realized, and due to the large number of rivets, stiffening members or stringers, composite bulkheads and the like, the number of parts has still been very large. The completed wing, however, became essentially of itself a box or multi-cellular type girder of high carrying capacity in proportion to its weight.

Because of the necessity for light weight, the materials used in the airfoils, irrespective of the actual type of structure used, have either been wood or light weight alloys and have been highly stressed. Because both of the materials mentioned are subject to deterioration, and because the nature of the structure has made it practically impossible to get inside of the wing in order to inspect the points of greatest danger, the problem of inspection and maintenance has been one of the greatest to confront the designer and the operator of aircraft. From one aspect, therefore, the invention here presented comprises broadly a wing formed of a plurality of separable sections, with fastening means between the sections, accessible from the exterior thereof, adapted to transfer the compressive, tensional, and shear stresses between the sections; and, considered from this aspect, the broad object is to provide a wing which may be dismounted to give complete accessibility to all parts thereof, internal and external, for the purposes of construction inspection, maintenance and repair.

Considered from another aspect the invention comprises a joint for connecting two compression-bearing elements of a structure and comprising a fitting at the end of each of said elements having complementary surfaces normal to the compression vector between the elements, with wedging means for holding the complementary surfaces in compressional relation, said wedging means being tensionally held in place by a member or members lying substantially in the plane of the shear stresses between the two elements, with the object of providing a joint or lock which is capable of holding a structural member rigidly in place, and which is, at the same time, susceptible of complete and accurate stress analysis, and which may, at the same time, be quickly and easily applied so that the mounting of the structure becomes a simple and quickly accomplished task.

From still a third point of view the structure of the invention comprises a relatively thick skin, approaching as closely as possible the monocoque ideal of withstanding in itself the compressional stresses imposed upon the structure without the use of longitudinal stiffeners, and transverse rib arches secured to the skin, by welding or countersunk riveting, the ends of the rib arches abutting against continuing arches on adjacent sections at end fittings adapted to transfer the stresses between contiguous sections, the rib arches connecting, either by permanent joints or by similar fittings to those between the rib sections, with struts to which a shear transmitting web is secured, the object from this aspect being to provide an aircraft structure having many fewer parts than conventional types.

Other objects of the invention are: To provide a structure having a substantially smooth surface, free from rivet heads or other projections tending to disturb laminar flow of air over the surface; to provide a structure wherein each of the separable sections is itself a self-supporting beam, so that no section is liable to overstress or deformation during dismounting or inspection; to provide a structure which is adaptable to fabrication either by riveting or, when the equipment is available, to welding; to provide a structure wherein riveted and welded sections may be combined either in manufacture or in repair; and to provide an aircraft structure which, with all of its advantages, is no more costly and may be less costly than conventional types.

This invention possesses numerous other objects and features of advantage, some of which, together with the foregoing, will be set forth in the following description of specific apparatus embodying and utilizing its novel method. It is therefore to be understood that this method is applicable to other apparatus, and that the invention is not limited, in any way, to the apparatus of the present application, as various other apparatus embodiments may be adopted utilizing the method within the scope of the appended claims.

Referring to the drawings:

Fig. 1 is an exploded perspective view illustrating the invention as embodied in an airplane wing of riveted construction.

Fig. 2 is a detailed perspective view, on a larger scale, showing, in disengaged position, a typical joint, as used in Fig. 1.

Fig. 3 is a view similar to Fig. 2, and showing the joint engaged.

Fig. 4 is a transverse sectional view of an airfoil of welded construction and also embodying the invention.

Figs. 5 and 6 are detailed views, on a larger scale, showing the joints between the sections of the airfoil of Fig. 4.

Fig. 7 is a transverse sectional view through one of the joints; and

Figs. 8a, 8b and 8c show one of the joint wedges in orthographic projection.

Figs. 9a, 9b and 9c show a slightly different form of joint wedge in orthographic projection.

Considering the invention in detail, the exploded perspective view of Fig. 1 represents an airplane wing as viewed from the root toward the tip. As illustrated, the wing comprises a plurality of spanwise separable sections, including a bottom or central section 1, a nose section 2, a trailing edge section 3, and a tip section 4. The trailing section 3 supports, as is customary, the aileron 5 and a flap 7.

For the purposes of detailed description of the construction we will consider primarily the bottom and nose sections 1 and 2, since these illustrate fully the principles involved, and the application of these principles to the other sections will, it is thought, be obvious from the drawings.

Each of the sections comprises a monocoque skin 9, which is preferably fabricated of one of the lighter magnesium alloys, although other metals, plastics, or plywood are within the scope of the invention. The light alloys, such as are known in the trade as "Dowmetal J–1" or "AMC57S" are only sixty-five per cent as dense as the aluminum alloys customarily used in aircraft construction, and can, accordingly, be made approximately fifty-four per cent thicker without increasing the weight over conventional designs. As a result of the added thickness, the skin or shell 9 is sufficiently resistant to elastic buckling to be used in a true monocoque structure, without the use of stiffeners, and it is accordingly possible to use the weight of the stiffeners in still further increasing the thickness of the shell, so that added resistance to buckling is obtained. This, of course, results in an enormous saving in the number of parts and the amount of riveting required.

Secured to the skin at regular intervals, which may either be uniform or may increase progressively or in steps from root to tip of the wing, are a plurality of rib arches 10. In the present embodiment these rib arches are of channel section, with the web of the channel against the skin 9, and are secured to the skin by drill-countersunk rivets. This structure is possible because of the relatively large thickness of the skin, and is advantageous since it avoids the turbulence of the surface layer and the accompanying parasitic resistance caused by projecting rivet heads. It is usually advisable to provide lightening holes in the rib flanges, (not indicated in the drawings), but this is a matter which depends upon the individual design and the degree to which the ribs are stressed in use.

Rising from approximately the center of the bottom section 1 is a web 11, for carrying the bending shears imposed upon the wing. The shear web 11 is secured to the skin 9 by riveted angle members 12, and at each rib 10 it is re-enforced by struts 13. As used on the center section the struts are, like the rib arches, constructed of channel sections, riveted to the web, and joined to the rib arches by gusset plates 14, these gussets also being of channel section, but the channels being inverted, with the flanges riveted to the flanges of the rib arches and the web turned away from the skin. Since the shear web 11 carries the principal portion of the bending moment shears of the wing, the struts are made double as shown, one channel being on each side of the shear web. The web is topped by a cap 15, formed, preferably, of an extruded alloy section.

The upper ends of the strut channels and the free ends of the rib arches all carry fittings 17, 19, for securing the other wing sections to the central section, and these fittings will be described in detail below.

It will be seen that the combination of stressed skin, rib arches, shear webs and struts make the section 1 a self-supporting beam, which may be handled as a unit without buckling or otherwise deforming. It is true that it is deforable in torsion, and if improperly handled might be injured in this manner, but it is perfectly capable of being handled with care without injury, and may be attached, as a unit, to the fuselage of the plane by means of the attachemnt flange 20.

The nose section 2 is similar in its design principles with the central or bottom section 1, but differs in detail. The nearly flat top portion of the section carries rib arches (not shown in the drawings) corresponding to each of the rib arches 10, and terminating in struts 21, just as the rib arches 10 terminate in the struts 13. In the curved nose section the rib arches take the form of nose formers 22, which may be cast, forged, or pressed forms, and which are flush-riveted to the skin 9 in the same fashion as the flatter portion of the arches. Because of the great rigidity of the more sharply curved nose section of the skin, however, alternate arches are omitted in this portion of the section, this construction giving ample stiffness, and resulting in a reduction in weight which is, of course, highly desirable. The nose section 2 also is provided with a shear web 23, and since the stresses on this web are less than those on the web 11, lightening holes 24 may be provided.

In this connection it should be noted that for best results the shear webs in adjacent sections should be so proportioned that under normal loads the deflections in the sections will be the same. The ribs may, it is true, be made strong enough to transmit the stresses which unequal normal deflection would impose, but it results in a lighter structure to provide a shear-bearing member of the proper size in each section, even though for constructional purposes only such additional shear member might be unnecessary.

In the case of the nose section also, it will be seen that the section forms a complete self-supporting beam, and in this case also fittings 17 and 19 (the latter not shown) are provided at the free ends of the struts and rib arches for connecting the nose section to the center section.

We may now consider a joint formed by the fittings 17 and 19, by means of which the separable airfoil sections are combined into a unitary structure. These fittings are preferably cast or forged of high tensile strength alloy, and taken together effectively form a gusset which connects the rib arches and struts in the same manner as is accomplished by the gussets 14, one-half of each of these composite or joint gussets being secured by riveting or otherwise to the rib arches 10 and to the struts 13 and 21 respectively. The general similarity between the joints and those formed by the permanent gussets 14 may be seen in Fig. 3, showing the joint assembled. Actually, however, it is formed of the two fittings 17 and 19, the dividing line between the two fittings being formed by complementary faces 25 on the two fittings, these faces being perpendicular to the vector of the compression forces to be transmitted between the rib and strut members. The complementary or conjugate faces of the fittings are traversed longitudinally by a groove 27, which receives a tie-bolt 29, whose direction is parallel to the shear vector, and each of the fittings is notched, as indicated by the reference characters 30, 31, to receive a tubular bolt retainer 32. This retainer is screwed in place in the fitting 19, as is indicated in the cross-sectional view of Fig. 7. Except for the retainer 32, the fittings 17 and 19 are substantially identical, the purpose of the retainer 32 being to hold the bolt 29 in place when the joint is disassembled in order to facilitate the assembly.

Each end of the tie-bolt 29 carries an internal wedge 33, 34, the wedge 33 on the head of the bolt being freely slidable thereon, whereas the wedge 34 is threaded and forms the nut engaging the bolt. Except as thus noted the wedges are substantially identical, each having flaring skirts 35, whose internal or wedge surfaces engage complementary external wedge surfaces 37 formed on the fittings adjacent the ends of the compression surfaces 25.

The assembled joint is shown in Fig. 3. Compressional stresses between the adjacent members are transferred through the surfaces 25. Tensional stresses are carried by the wedges 33 and 34, which analysis shows may be made amply strong to carry these stresses with an adequate factor of safety. Such stresses are carried as tension by the tie-bolt 29. It is by no means the least advantageous characteristic of the joint that the stresses are thus completely separable for analysis, this permitting design of the necessary strength without the addition of any excess weight. The most complex stresses involved are those in the wedges 33 and 34, in which the forces due to tension and shear across the joint appear as bending moments, but because of the small size of the elements to which these forces are applied the requisite amount of material to reduce the fiber stresses to their proper values may readily be supplied and the weight still kept very low. Heavy and light duty wedges are shown respectively in Figs. 8 and 9, the wedge of Fig. 9 having internal conical faces for transmitting longitudinal shears. Alloy steel is the preferred material for these wedges, but here too there is a choice dependent on the duty imposed on the joint.

In assembling the sections the loosened bolts are held in their retainers 32, with the upper one of the wedges 34, 35, hooked to the fitting 19, and the nose section is then placed in position, with the faces 25 of the fittings 17 and 19 in contact. The bolts 29 are then tightened, the wedges forcing the faces 25 into compression and the bolts are then secured against rotation by means of the customary locking wire 39 or by lock washer or other conventional device. It will be seen that ample space is provided for the necessary manipulation in these operations, since the skins 9 of the two sections are spaced to leave a gap, which, after assembly, is closed by a cover-plate 40, which may be held in place by screws, clips, or otherwise as may be desired. The free edge of skin 9 between adjacent arch members 10 would tend to buckle elastically at rather low stresses. For this reason it is reinforced by angle 38, which imparts stiffness to the skin between the rib arches.

The trailing section of the wing differs, of course, in form from the central or nose sections, but the principles involved are identical. Certain of the rib arches 41 are of special form, which may vary from station to station along the span, in order to accommodate the flaps, ailerons, etc., and these ribs may be of bent channel section or may be cast or forged formers, as indicated by the exigencies of the design. The section, however, includes a shear web 43, and hence this section also is a beam capable of supporting itself. The section is joined to the center or bottom section of the wing in precisely the same manner as is the nose section. The wing tip 4 is usually little more than a mere fairing, and may be made entirely conventional in design or may embody certain of the principles here disclosed.

It will be seen that the completed wing, when assembled, is made up of a plurality of completely unobstructed spanwise passages, in which control wires, rods, or linkages may be mounted, lighting wires may be run, fuel tanks may be positioned, or other accessories may be placed at the will of the designer. When the wing is disassembled all of these various appurtenances are completely open for inspection, adjustment, and repair, as is the wing structure itself. Any weakening due to incipient corrosion may easily be detected, loosened accessory bolts may similarly be detected and replaced, and since the entire structure may be opened to the full light of day, inspection may be complete and nowhere need the soundness of the structure be taken on trust. Furthermore, if weakness should occur from age, corrosion, or accident, the faulty member may be replaced either by the substitution of an entire wing section, or by piecemeal repair. Furthermore, all of the stresses are properly and widely distributed, without concentrations which are undesirable in a monocoque structure, and as has already been indicated the construction as a whole approaches much more closely to the monocoque ideal than do those which have heretofore been possible.

Fig. 4 is a transverse section of a wing panel, chosen for illustration primarily because of its differences from the structure of Fig. 1, in order to show the flexibility of the principles here involved. In this case the airfoil has a symmetrical profile, and comprises trailing edge sections 51 and 52, which are substantially identical in construction, being "mirror images" of each other. The lower and upper nose sections 53 and 54, differ only slightly and in that the upper section 54 is carried slightly beyond the plane of symmetry in order to meet a slightly shorter or narrower lower section. The main spar or shear web 55 is not fixedly attached to any of the sections, the shears due to bending being carried by the curved end of the nose section, when the airfoil is separated into its component parts, while the similar stresses in the trailing section are carried by the divided shear web 57, 59.

In this modification the rib arches 71 are structural T-sections, with lightening notches 72 formed in the web, leaving projections 73 which rest upon the monocoque skin 9 and are secured thereto by welding, the magnesium alloys preferred being very satisfactory for use of this process. The web struts 74 are formed similarly to the rib arches, and are spaced along the web 55 in alinement with the arches.

The fittings for joining the sections are merely indicated in Fig. 4 but are shown in detail in Figs. 5 and 6. Fig. 5 shows the joint as applied to the junction between the nose, trailing edge, and shear web, and because the parts thereof are identical in function with those shown in Figs. 2 and 3, they are identified by similar reference characters, distinguished by accents. The primary difference is, of course, that the fittings are designed for use in connection with T-shaped instead of channel rib and strut members, the fitting 19' being welded to the rib arch 71 to form an integral structure therewith, while the fitting 17' is similarly welded to the strut 74. This welding is preferably done in a jig prior to the application of the rib arches and struts to the plate members, and it will be apparent that in the case of large production it would be easily possible to cast or forge these compression members and their fittings instead of fabricating them by welding.

The tie-bolt 29' and retainer 32' are identical with those used in the riveted construction. The internal wedges 33' and 34' differ slightly, as is shown best in Fig. 9 which shows three views of the wedge 34', the difference being that the skirts 35', are approximately semicircular in elevation instead of rectangular, and that the wedging surfaces within the skirts are concave. It will be apparent, however, that in function the two joints are the same, that the structure used in the welded joint could equally well be incorporated in the riveted joint or vice versa, and that by the mere provision of wedges wherein one-half is formed as illustrated in Fig. 2 and the other as illustrated in Fig. 8, it is possible to combine the two types of fittings should it ever be desirable to do so for emergency repair purposes.

Fig. 6 shows in detail a joint between the nose section of the structure of Fig. 4. and is of interest in that where such a joint is used the fittings 75 and 77 which form the joint may themselves be considered as part of the rib arch, or as a strut, as readily as they may be considered fittings. In its other feature this joint is identical with that of Fig. 5.

Except that it is between straight instead of curved members, the joint 79 between the two trailing edge sections 51 and 52, is so similar to that between the nose sections that detailed description is believed to be unnecessary.

In the descriptions of each of the modifications of the invention as thus far given, attention has been directed to the transfer of the major stresses of tension, compression and shear in a wing considered as a beam. Shear stresses across the joints in a spanwise direction, i. e., normal to the direction of the tie-bolts, are relatively minor, but must, of course, be accounted for and borne. These stresses may be carried in either or both of two ways. First, by the tie-bolts themselves, acting against the walls of the grooves 27 wherein they lie; second, by the skirts of the wedges acting against the fittings. It will be seen that in the form shown in Figs. 2 and 3 the flat sides of the wedges 33, 34, abut against the flanges of fittings 17 and 19 to carry this component of stress. In the form shown in Figs. 5, 6, and 8 the surfaces of the wedge skirts 35 may be made concavely conical, and acting against convexly conical surfaces 27' also help to take the transverse shear, and reference is made to the copending application of the same inventors, Serial No. 339,646 filed June 10, 1940, for a complete description of joints in which internal wedges of this type are used.

We claim:

1. A monocoque type airfoil comprising a plurality of beam components; each beam component having a plurality of spaced rib arches extending transversely thereof, a web extending longitudinally thereoof in a position to lie adjacent the extremities of rib arches of an adjacent beam component, and a monocoque skin secured to said spaced rib arches; means for removably securing said beam components together along said webs and within the profile of said airfoil, with the monocoque skin of one beam component terminating in spaced relationship to the monocoque skin of the adjacent beam component to form a gap for access to said securing means; and a skin insert bridging said space and lying substantially flush with the skin of each of said adjacent beam components.

2. A monocoque type airfoil comprising a plurality of beam components, each beam component having a plurality of spaced rib arches extending transversely thereof, a shear web extending longitudinally thereof in a position to lie adjacent the extremities of rib arches of an adjacent beam component, and a monocoque skin secured to said spaced rib arches; means for removably secured said beam components together along said webs and within the profile of said airfoil, with the monocoque skin of one beam component terminating in spaced relationship to the monocoque skin of the adjacent beam component to form a gap for access to said securing means, said securing means including a joint between such a web and substantially each of such adjacent arches; and a skin insert bridging said space and lying substantially flush with the skin of each of said adjacent beam components.

3. A monocoque type airfoil comprising a plurality of beam components, each beam component having a plurality of spaced rib arches extending transversely thereof, a shear web extending longitudinally thereof in a position to lie adjacent the extremities of rib arches of an adjacent beam component, and a monocoque skin secured to said spaced rib arches; means for removably securing said beam components together along said webs and within the profile of said airfoil, with the monocoque skin of one beam component terminating in spaced relationship to the monocoque skin of the adjacent beam component to form a gap for access to said securing means, said securing means including a plurality of joints each having separate members for transferring compressional, tension and shear stresses between said beam components; and a skin insert bridging said space and lying substantially flush with the skin of each of said adjacent beam components.

4. In a separable structure, a plurality of rib arches; a web extending transverse to said rib arches; a plurality of separable joints connecting individual rib arches to an adjacent edge of said web; each separable joint comprising tension, shear and compression elements for transferring tensional, shear and compressional stresses respectively between said web and said rib arches; said joints holding said rib arches with their adjacent ends in spaced relationship to said web, leaving a gap in the profile of said structure for access to said joint means; and a closure for said gap substantially flush with adjacent surfaces of said structure.

5. In a separable structure, a plurality of rib arches; a web extending transverse to said rib arches; and a plurality of separable joints connecting individual rib arches to an adjacent edge of said web; each separable joint comprising a fitting attached to said web and extending toward a rib arch, said fitting having a face in a plane which will intersect the plane of said web beyond the adjacent edge of said web, a fitting on said rib arch having a face providing a complementary fit with said first mentioned face, and wedge means movable in the plane of said faces and within the profile area of said structure for holding said faces in compressive relationship; said joints holding said rib arches with their adjacent ends in spaced relationship to said web, leaving a gap in said profile for access to said wedge means.

6. In a separable structure, a plurality of rib arches; a web extending transverse to said rib arches; a plurality of separable joints connecting individual rib arches to an adjacent edge of said web, each joint comprising a fitting attached to said web and extending toward a rib arch, said fitting having a face in a plane which will intersect the plane of said web beyond the adjacent edge of said web, a fitting on said rib arch having a face providing a complementary fit with said first mentioned face, and wedge means movable in the plane of said faces and within the profile area of said structure for holding said faces in compressive relationship, said joints holding said rib arches with their adjacent ends in spaced relationship to said web, leaving a gap in said profile for access to said wedge means; and an insert in said gap substantially flush with adjacent surfaces of said structure.

JOHN K. NORTHROP.
VLADIMIR H. PAVLECKA.